(12) United States Patent
Kondo et al.

(10) Patent No.: US 7,455,822 B2
(45) Date of Patent: Nov. 25, 2008

(54) METHOD FOR PRODUCTION OF SILICON

(75) Inventors: Jiro Kondo, Futtsu (JP); Masaki Okajima, Futtsu (JP); Shinji Tokumaru, Futtsu (JP); Hitoshi Dohnomae, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 742 days.

(21) Appl. No.: 10/490,584

(22) PCT Filed: Jul. 22, 2003

(86) PCT No.: PCT/JP03/09275

§ 371 (c)(1),
(2), (4) Date: Mar. 23, 2004

(87) PCT Pub. No.: WO2004/009493

PCT Pub. Date: Jan. 29, 2004

(65) Prior Publication Data

US 2004/0247512 A1 Dec. 9, 2004

(30) Foreign Application Priority Data

Jul. 23, 2002 (JP) .............................. 2002-213853

(51) Int. Cl.
*C01B 33/02* (2006.01)
(52) U.S. Cl. .................. 423/350; 423/348; 423/349
(58) Field of Classification Search ................. 423/348, 423/349, 350; 23/301; 65/19
See application file for complete search history.

(56) References Cited

U.S. PATENT DOCUMENTS

| | | | |
|---|---|---|---|
| 875,285 A | 12/1907 | Potter | |
| 2,402,839 A * | 6/1946 | Ohl | .............................. 257/41 |
| 3,010,797 A | 11/1961 | Aries | |
| 3,660,298 A | 5/1972 | McClincy et al. | |
| 4,193,975 A * | 3/1980 | Kotval et al. | ................. 423/348 |
| 5,601,656 A * | 2/1997 | Li | ................................. 134/2 |
| 6,395,249 B1 * | 5/2002 | Kondo et al. | ................. 423/349 |

FOREIGN PATENT DOCUMENTS

| | | | |
|---|---|---|---|
| CN | 1191520 | | 8/1998 |
| EP | 1057782 | | 12/2000 |
| GB | 2116956 A | * | 10/1983 |
| JP | 62123009 | | 6/1987 |
| JP | 6379717 | | 4/1988 |
| JP | 2001097708 | | 4/2001 |
| WO | 8907578 | | 8/1989 |
| WO | 9703922 | | 2/1997 |
| WO | 9933749 | | 7/1999 |

OTHER PUBLICATIONS

Translation of First Office Action re 03801130.1.

* cited by examiner

*Primary Examiner*—Steven Bos
*Assistant Examiner*—Anthony J Zimmer
(74) *Attorney, Agent, or Firm*—Baker Botts LLP

(57) ABSTRACT

A process for production of Si, characterized by adding an oxide, hydroxide, carbonate or fluoride of an alkali metal element, or an oxide, hydroxide, carbonate or fluoride of an alkaline earth metal element, or two or more of such compounds, to solid SiO in a total molar amount of from 1/20 to 1000 times with respect to the moles of solid SiO, heating the mixture at between the melting point of Si and 2000° C. to induce a chemical reaction which produces Si and separating and recovering the Si from the reaction by-product, for the purpose of inexpensively and efficiently producing Si from various forms of solid SiO with no industrial value produced from Si production steps and the like.

20 Claims, No Drawings

METHOD FOR PRODUCTION OF SILICON

CROSS-REFERENCE TO RELATED APPLICATION(S)

This application is a national stage application of PCT Application No. PCT/JP03/09275 which was filed on Jul. 22, 2003, and published on Jan. 29, 2004 as International Publication No. WO 2004/009493 (the "International Application"). This application claims priority from the International Application pursuant to 35 U.S.C. § 365. The present application also claims priority under 35 U.S.C. § 119 from Japanese Patent Application No. 2002-213853 filed on Jul. 23, 2002, the entire disclosure of which is incorporated herein by reference.

FIELD OF THE INVENTION

The present invention relates to an economical industrial process for production of silicon (Si) from cheaply produced SiO or from conventional SiO waste.

BACKGROUND INFORMATION

SiO is a material used for coating of optical lenses or for insulating films and the like, but it is not in very high industrial demand because other materials are currently more popular for such purposes. SiO is produced not only industrially but also during the course of reaction between molten Si and quartz crucibles in Si single crystal pulling processes or in Si production steps in which silica stone is reduced with carbon. However, many of these processes currently involve treatment as industrial waste. Meaningful use of SiO, such as inexpensive production of Si from SiO, would therefore provide a major contribution from the viewpoint of economy and recycling of resources.

Japanese Patent Publication No. 63-79717, for example, describes an attempt to produce Si from SiO, as a process in which SiO gas is generated from silica stone and metallic silicon and is reduced with carbon kept at a temperature of 1600-2400° C. U.S. Pat. No. 875,285 also describes a process of reducing SiO with carbon. However, because reduction with carbon results in contamination of the Si with large amounts of unreacted carbon, the Si obtained is of low purity and therefore even inexpensive SiO starting materials yield Si with low economic value.

U.S. Pat. No. 3,010,797 describes a process which uses hydrogen for reduction of SiO gas obtained by reacting silicon and silica and, particularly, the reduction is accomplished with hydrogen which has passed through palladium or the like, or with hydrogen in the presence of platinum. However, attempts to reduce SiO gas with hydrogen generally confront a problem in the need for large volumes of hydrogen. Example 1 of the aforementioned U.S. Pat. No. 3,010,797 indicates that a total volume of 90.5% Si was obtained from SiO, and this is six times the stoichiometric volume of hydrogen. Also, although palladium is used in Example 3 of U.S. Pat. No. 3,010,797, twenty times the stoichiometric volume of hydrogen was necessary to obtain 86.5% of the total volume of Si from SiO. Since one mole of Si is approximately 28 g and one mole of hydrogen is approximately 22.4 L at room temperature and 1 atmosphere, the reaction described in the aforementioned example prefers 134-448 L of hydrogen to obtain approximately 28 g of Si, even if 100% of the Si in the SiO is obtained. This is also specified in claim 1 of U.S. Pat. No. 3,010,797, where it is stated that a stoichiometric excess of hydrogen is necessary for reduction. Considered in industrial terms, it is difficult to inexpensively obtain Si in a process which prefers a few hundred L of hydrogen to obtain 28 g of Si.

Japanese Patent Publication No. 62-123009 describes a process for producing silicon wherein silicon tetrachloride, trichlorosilane, silane and a silicon alcoholate are subjected to thermal decomposition or flame thermal decomposition to produce fine granular aggregates of silicon monoxide and/or silicon dioxide, and the fine granular aggregates are reduced in a reducing atmosphere at 200° C. or above. However, silicon tetrachloride, trichlorosilane, silane and silicon alcoholates are expensive, while also having many restrictions on their handling because of their corrosive and flammable properties, and thus they have not been industrially or economically suitable.

Processes for reduction of SiO also include those making use of disproportionation reactions. U.S. Pat. No. 3,660,298 describes that SiO gas at about 1800° C. undergoes the following disproportionation reaction: $2SiO \rightarrow Si + SiO_2$. Although U.S. Pat. No. 3,660,298 does not particularly describe the method of separating and recovering the Si produced by this disproportionation reaction, as Si and $SiO_2$ are both liquid at 1800° C. and should precipitate from the gas in the form of a mixture, separation and recovery of the Si would not be a simple matter. Consequently, processes for obtaining Si by disproportionation reaction from SiO gas are neither industrially nor economically feasible.

An economical process for production of Si from SiO has previously been disclosed by the present inventors in Japanese Patent Application No. 2000-526444. Preferably, it is a process for the production of Si wherein solid SiO is heated at between 1000° C. and 1750° C. for decomposition to liquid or solid Si and solid $SiO_2$, and the produced Si is separated from the $SiO_2$. According to this process, the Si particles generated, especially above the Si melting point of 1412° C., naturally coalesce as they accumulate and thereby naturally separate from the $SiO_2$ by-product, thus facilitating recovery of the produced Si. However, the process prefers that the SiO starting material be packed as uniformly and densely as possible into the reactor, and problems arise when the packing density is low or the packing is non-uniform to result in incomplete separation of the Si and poor Si recovery efficiency. Presumably, the reason is that the Si which is produced separates because of its low wettability with the $SiO_2$ by-product, but when gaps are present due to incomplete packing of the SiO starting material, the produced Si collects in those areas and thereby reduces the Si recovery efficiency.

Nevertheless, SiO generated in an Si single crystal pulling processes or in Si production steps in which silica stone is reduced with carbon as described above consists of fine particles with a mean particle size of 1 μm or smaller, flakes with lengths of 1 cm or greater or amorphous masses with lengths of 1 cm or greater, and in order to achieve uniform, highly dense packing of the SiO into the reactor it is necessary to carry out granulation in the case of fine particles, or pulverization and particle size classification in the case of flakes or masses. Due to the need for such complicated steps, production of Si using the aforementioned SiO by-product as starting material has been problematic from an industrial and economical standpoint.

One of the objects of the present invention, which has been accomplished with the aim of solving the problems described above, to successfully achieve efficient separation and extraction of Si by disproportionation reaction in its produced form, without steps such as Si shape ordering or classification, even for SiO in forms which do not easily allow uniform, high-density packing, i.e. SiO in the form of fine particles, scales or amorphous masses, or mixtures thereof.

SUMMARY OF THE INVENTION

The term "solid SiO" as used throughout the present specification refers to a solid composed essentially of the elements Si and O with the Si atoms and O atoms in a ratio of roughly 1:1, and being essentially homogeneous in composition in structure. "Solid SiO" is explained in this way because various forms of solid SiO exist which, for example, exhibit amorphous patterns with X-ray diffraction measurement or have strong diffraction peaks believed to arise from a regular crystal structure, such that the structure of solid SiO remains incompletely identified.

For this reason, the thermodynamic data have been unreliable and almost no attempt has been made to utilize solid SiO in chemical reactions. However, as generally any type of solid SiO will readily gasify at high temperature without passing through a liquid state, and SiO gas consists of SiO molecules of which the properties are well known, solid SiO has come into use as a vapor deposition material.

Solid SiO takes various forms including that of foils, masses and the like, but most vapor deposition materials are in powder form.

In light of the aspects of uncertainty in regard to solid SiO, therefore, research has been conducted on processes for efficiently producing Si regardless of the form of the solid SiO starting material, and as a result it has been determined that Si is produced when an oxide, hydroxide, carbonate or fluoride of an alkali metal element, or an oxide, hydroxide, carbonate or fluoride of an alkaline earth metal element, or two or more of such compounds, are added to solid SiO and the mixture is heated. For example, when the alkali metal oxide $Na_2O$ is added to massive solid SiO with sizes of a few centimeters or larger, in a ½ molar amount with respect to the solid SiO, and these are placed in a reactor and heated by temperature increase to 1500° C. and then cooled, the Si which accounts for about ½ of the molar amount of solid SiO was observed as a sunken single mass at the bottom of a glassy substance, and analysis of the glassy substance identified it as sodium metasilicate $Na_2SiO_3$, a type of water glass. The Si was believed to be produced as a single mass because of mutual fusion due to lower surface energy.

The aforementioned reaction differs significantly from the method described in Japanese Patent Application No. 2000-526444, in that the solid SiO and the one or more oxides, hydroxides, carbonates or fluorides of alkali metals or alkaline earth metals added thereto do not need to be uniformly packed at high density in the reactor and, therefore, the form of the solid SiO is not restricted in any way. The present invention preferably uses this finding.

In particular, accordingly to an exemplary embodiment of the present invention, a process for production of Si is provided, e.g., by adding an oxide, a hydroxide, a carbonate or a fluoride of an alkali metal element, or an oxide, a hydroxide, a carbonate or a fluoride of an alkaline earth metal element, or two or more of such compounds, to solid SiO in a total molar amount of from {fraction (1/20)} to 1000 times with respect to the moles of solid SiO. The mixture is heated at between the melting point of Si and 2000° C. to induce a chemical reaction, which produces Si that is separated and recovered from the reaction by-products.

According to another exemplary embodiment of the present invention, Si can be produced, e.g., by adding a substance containing an oxide, hydroxide, carbonate or fluoride of an alkali metal element, or an oxide, hydroxide, carbonate or fluoride of an alkaline earth metal element, or two or more of such compounds, to solid SiO in a total molar amount of from 1/20 to 1000 times of the compound contained therein with respect to the moles of solid SiO. The mixture is heated at between the melting point of Si and 2000° C. to induce a chemical reaction which produces Si, and Si is separate and recovered from the reaction by-product.

The alkali metal element may be sodium and/or potassium, and the alkaline earth metal element can be one or more from among magnesium, calcium and barium. The temperature of the heating may be between the melting point of Si and 1700° C. The atmosphere for the heating may be an inert atmosphere, an oxidizing atmosphere, or a reducing atmosphere. At least 20 wt % of the solid SiO can consist of one or more forms from among fine particles with a mean particle size of 1 µm or smaller, flakes with lengths of 1 cm or greater and masses with lengths of 1 cm or greater. The separation of the Si from the reaction by-product may be followed by washing removal of deposits on the Si with hydrofluoric acid.

According to another exemplary embodiment of the present invention, Si may be washed with hot water at 30-300° C. to remove the deposits. SI can also be further vacuum treated at a temperature between the melting point and the boiling point of Si to increase the purity.

DETAILED DESCRIPTION

The form of the solid SiO starting material used for an exemplary embodiment according to the present invention is not particularly important. That is, fine particles, flakes, large masses or mixtures thereof may be used. There is also no need for the solid SiO and added alkali metal oxide, etc. to be uniformly packed at high density in the reactor.

According to an exemplary embodiment of the present invention, solid SiO and at least one selected from among oxides, hydroxides, carbonates and fluorides of alkali metals or alkaline earth metals are reacted at a high temperature of between the melting point of Si and 2000° C., to produce Si and a $SiO_2$-containing by-product. For example, a reaction between solid SiO and, for example, calcium oxide of the alkaline earth metal oxide, and calcium fluoride of the alkaline earth metal fluoride, produces Si and glass composed of $SiO_2+CaO+CaF_2$. As the reaction is conducted at above the melting point of Si, the total reaction product is molten liquid such that the Si can be efficiently recovered regardless of the packed condition of the starting material in the solid state prior to the reaction.

For mixing of the solid SiO with the one or more additives selected from among alkali metal or alkaline earth metal oxides, hydroxides, carbonates and fluorides, an exemplary method according to the present invention is charging of both together into the reaction vessel before raising the temperature. Alternatively, the solid SiO and additives may be charged into a molten liquid reaction system at above the melting temperature of Si, containing solid SiO and additives previously reacted at high temperature. The solid SiO and additives may also be charged in alternate succession, or the solid SiO may be charged after previously melting the additives charged alone. In any case, the Si will be separable as a single mass if the prescribed amount of the solid SiO and additives are supplied to the reactor and the entire mixture is heated above the melting temperature of Si.

As additives to the solid SiO used for the exemplary embodiment of the present invention, there may be selected two or more from among oxides, hydroxides, carbonates and fluorides of alkali metal elements or oxides, hydroxides, carbonates and fluorides of alkaline earth metal elements, or mixtures thereof. Among these, it is believed that hydroxides and carbonates of alkali metal elements or alkaline earth metal elements, when heated at above the melting point of Si, undergo elimination of $H_2O$ and $CO_2$, respectively, to yield the corresponding alkali metal element or alkaline earth metal element oxides. Fluorides are believed to form molten liquids in the original compound form.

As exemplary elements for the aforementioned additives, sodium and potassium may be preferable as alkali metal elements and magnesium, calcium and barium as alkaline earth metal elements.

The role of the additives is to react with the SiO to melt the compounds other than Si which are produced, such as $SiO_2$, to liquid form and to lower the viscosity. If this is achieved, the Si produced by the reaction between the SiO and additives will readily coalesce into a single mass, thereby greatly facilitating its separation and recovery from the compounds other than Si. For this purpose, the additives are preferably added in an amount of at least 1/20 of the number of moles of the solid SiO. There are no particular restrictions on addition of the additives in excess of this amount, and for example, the Si will be produced in separation even if a small amount of solid SiO is charged into a large amount of additives in a molten state at above the melting point of Si. From an industrial viewpoint, however, the additives are preferably present at no greater than in a molar ratio of 1000 times with respect to the Si. For efficient heat conduction, the amount of additives is most preferably at least 1/10 time and no greater than 50 times the number of moles of the solid SiO.

Substances containing the additive components may also be added in amounts such that the number of moles of additive components in such substances are from 1/20 to 1000 times the number of moles of the solid SiO. $Na_2O$, for example, may be added in a number of moles of from 1/20 to 1000 times with respect to the solid SiO. For example, as indicated above, a compound containing $Na_2O$ such as water glass ($Na_2O.nSiO_2$ (n=1, 2, 3, 4, . . . )) may be used instead of $Na_2O$, in which case it may be added so that the number of moles of $Na_2O$ in the compound is at least 1/20 of the number of moles of the solid SiO.

The temperature range for the reaction between the solid SiO and the additives according to the present invention is preferably between the melting point of Si (1412° C.) and 2000° C. For efficient recovery of the resulting Si it is preferably in the form of a single mass instead of small dispersed masses, and for this purpose the reaction should be conducted at the melting point of Si (1412° C.) or higher. If the reaction temperature is higher than 2000° C., the added compound containing the alkali metal element and/or alkaline earth metal element will undergo severe gasification, rendering the process impractical. The reaction temperature may be under 1700° C. as this will allow more complete suppression of gasification of the added compound containing the alkali metal element and/or alkaline earth metal element.

The atmosphere for the reaction between the solid SiO and the additives according to an exemplary embodiment of the present invention may be an inert atmosphere, an oxidizing atmosphere or a reducing atmosphere, which each provide the following respective advantages.

In an inert atmosphere, no chemical reaction occurs between the atmosphere components and the solid SiO and additives, although at high temperature some slight gasification of the additive will occur if the additive is an alkali metal element oxide, but virtually no gasification occurs if the additive is an alkaline earth metal compound. As inert gases there may be mentioned argon or nitrogen, which does react slightly with Si, and mixtures thereof.

In an oxidizing atmosphere, gasification of the additive can be significantly suppressed even if the additive is an alkali metal element oxide, but the produced Si will be oxidized, thereby often slightly lowering the Si yield. As oxidizing atmospheres there may be mentioned oxygen, air and oxygen-containing inert gases.

In a reducing atmosphere, the solid SiO will sometimes be slightly reduced to Si, thereby often leading to a small increase in the Si yield. However, the stability of the additives will be lower, and alkali metal element oxides will tend to gasify. Gasification of alkali metal element oxides leads to deposition of the alkali metal element oxides onto the reactor furnace walls and corrosion of the furnace material, and therefore it is preferred to minimize such gasification. As reducing atmospheres there may be mentioned hydrogen and hydrogen-containing inert gases.

Thus, inert atmospheres, oxidizing atmospheres and reducing atmospheres all have their respective advantages and disadvantages, and selection of the atmosphere will depend on the properties of the additives, the material of the inner walls of the reactor, etc.

The pressure conditions for an exemplary embodiment of the present invention are not especially restricted, but 1 atmosphere will usually be appropriate for operation. If it is desirable to completely minimize gasification of the alkali metal elements, alkaline earth metal elements or their oxides, the interior of the reaction vessel may be held at a higher pressure than atmospheric pressure in some cases, but from an industrial standpoint the pressure is preferably no greater than several tens of atmospheres. When an alkali metal element or alkaline earth metal element hydroxide or carbonate is added, heating at above the melting point of Si will result in elimination of $H_2O$ and $CO_2$, respectively, from these compounds, and the pressure may therefore be reduced to below 1 atmosphere if it is desired to accelerate such elimination.

The form of the solid SiO starting material used for an exemplary embodiment according to the present invention is not particularly limited. It may even be in a form which is difficult to pack uniformly at high density. Fine particles, flakes, large masses or mixtures thereof may be used. Since large gaps are present between solid SiO when 20 wt % or more of the solid SiO consists of fine particles, flakes or large masses, the process of the present invention is particularly effective for such forms. This is because Si accumulates in these gaps resulting in poor Si extraction efficiency in the process described in Japanese Patent Application No. 2000-526444, i.e. a process of extracting Si from SiO by heating alone without adding a compound with an alkali metal element or alkaline earth metal element.

The particle size range for the aforementioned fine particles is from a particle size which is difficult to pack uniformly and densely, up to a particle size which presents no particular problem for packing, and specifically, the mean particle size may be up to 1 μm, with no particular lower limit. The size ranges for flakes and masses are ranges for sizes which are difficult to pack uniformly and densely into the reactor, with no particular upper limit to the sizes, and any size which can fit into the reactor is acceptable. Specifically, flakes are flaky SiO with lengths of 1 cm or greater while masses are massive SiO with lengths of 1 cm or greater, and such sizes have very poor packing properties and have been unusable as described in Japanese Patent Application No. 2000-526444.

According to another embodiment of the present invention, there may not be any need for uniform and highly dense packing of the added alkali metal oxides, etc. into the reactor.

The reactor is preferably one provided with a lid, from the viewpoint of minimizing gasification of alkali metal elements, alkaline earth metal elements or their oxides. When hydroxides and carbonates of alkali metal elements and/or alkaline earth metal elements are added and heated at above the melting point of Si, elimination of $H_2O$ and $CO_2$ occurs from these compounds, respectively, and since it is preferred for these gases to be released out of the system, the reactor preferably also has a function for releasing gas at about a prescribed pressure, or a function for conducting gas flow at below a prescribed pressure. However, this type of reactor is not an essential condition for the present invention.

The material of the reactor may be carbon, a ceramic or a refractory material, and the material selected should be one which reacts as little as possible with the additives.

Because molten Si and the molten glass reaction by-product are produced in the reactor at a high temperature above the melting point of Si, the method of separating and recovering the large amount of Si produced may involve tilting the reactor for separate draining of the Si and molten glass. If the molten glass consists primarily of an alkaline earth metal element the Si will float over the molten glass layer, thus allowing the Si alone to be drained for separation and recovery simply by tilting the reactor. Fresh solid SiO may be charged into the remaining molten glass for subsequent Si extraction reaction. If the molten glass consists primarily of an alkali metal element the Si will sink below the molten glass layer, thus allowing the molten glass to be drained first when the reactor is tilted, with the Si being drained for recovery thereafter. After draining the glass, the Si may be cooled for solidification in the reactor instead of being drained. Also, as the melting point of glass composed mainly of alkali elements will generally be lower than the melting point of Si, the temperature of the reactor may be adjusted to be higher than the melting point of the glass and lower than the melting point of Si, for solidification of Si at the bottom of the reactor and efficient draining of only the upper molten glass layer. The method of draining the Si or reaction by-product is not limited to tilting the reactor, and as an alternative method, one or more draining ports may be provided in the reactor to allow separate drainage of the separated molten Si layer and molten glass layer.

As the method for separating the Si produced according to an exemplary embodiment of the present invention, there may be mentioned a method in which the total reaction product is cooled to solidification and then the Si mass is removed from the glassy substance and washed. As Si and glassy substances are relatively detachable, most of the glassy substance will be easy to remove from the Si. After removal, the slight deposits remaining on the surface of the Si can be removed by dissolution with hydrofluoric acid at a concentration of 10-100 wt %. Hydrofluoric acid at a concentration of less than 10 wt % is not preferred because of its low dissolving and removal power. However, there is no particular restriction on high hydrofluoric acid concentrations.

When the additive used is an alkali metal element compound, and particularly sodium, the deposits may be removed by washing with hot water as a method with a powerful removal effect, as using hot water will greatly facilitate the industrial process as compared to washing removal with hydrofluoric acid. An appropriate temperature for the hot water is 30-300° C. If the hot water temperature is below 30° C. the washing removal power is reduced, while a temperature exceeding 300° C. is not preferred from an industrial standpoint. As pressurization above 1 atmosphere is necessary if the temperature is above 100° C., a temperature of 100° C. does not require pressurization is preferable in terms of industrial handling and efficiency. There are no particular restrictions on the water used, but it is preferably purified water which does not contaminate the Si and maintains the purity of the aqueous solution (water glass) containing the $Na_2O$ and $SiO_2$ produced as a result of the washing.

The Si obtained by the process described above will sometimes contain slight amounts of alkali metal elements and/or alkaline earth metal elements. The content thereof will not be more than about 50 ppm by weight, but if necessary they can be removed from the Si by vacuum treatment at a temperature above the melting point and below the boiling point of Si. The vacuum is sufficient at up to about 10 Pa as obtained with a rotary pump, to easily allow reduction under 1 ppm up to about 1 ppb. As a secondary effect, other elements with high vapor pressures such as phosphorus are also removed by such vacuum treatment.

EXAMPLES

Example 1

Using 250 g of 99.999% pure solid SiO in the form of fine particles with a mean particle size of about 0.05 μm and 90 g of 99% pure calcium oxide in powder form as the starting materials, the materials were placed in a lidded carbon vessel and the vessel was situated at a prescribed location in a resistance heating furnace which was then evacuated, after which argon gas was introduced to 1 atmosphere. Argon gas subsequently flowed through at a flow rate of 1 L/min, and the internal furnace pressure was kept at approximately 1 atmosphere. The temperature of the resistance heating furnace was increased to 1500° C. at a rate of 10° C./min and, after maintaining the temperature of 1500° C. for 60 minutes, it was cooled to room temperature.

When the reaction product remaining in the carbon reactor was examined after cooling, the overall condition was observed to have been solidified after melting to liquid, and several nearly spherical masses with diameters of a few centimeters and exhibiting metallic gloss were found among the solid. The masses were recovered for a total of 72 g, and elemental analysis thereof revealed Si at 99.999% purity. The glassy reaction residue present in addition to the Si masses was also analyzed and found to consist primarily of $SiO_2$ and CaO.

Example 2

Using 250 g of 99.999% pure solid SiO in the form of flakes with sizes of a few centimeters square and thicknesses of no greater than 1 mm and 90 g of 99% pure calcium oxide in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and several nearly spherical masses with diameters of a few centimeters and exhibiting metallic gloss were found among the solid. The masses were recovered for a total of 73 g, and elemental analysis thereof revealed Si at 99.999% purity. The glassy reaction residue present in addition to the Si masses was also analyzed and found to consist primarily of $SiO_2$ and CaO.

Example 3

Using 250 g of 99.999% pure solid SiO in the form of masses with sizes of a few centimeters square and 90 g of 99% pure calcium oxide in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and several nearly spherical masses with diameters of a few centimeters and exhibiting metallic gloss were found among the solid. The masses were recovered for a total of 75 g, and elemental analysis thereof revealed Si at 99.999% purity. The glassy reaction residue present in addition to the Si masses was also analyzed and found to consist primarily of $SiO_2$ and CaO.

Comparative Example 1

Heat treatment, etc. was conducted using the same starting materials as in Example 3 and with the same apparatus and conditions as in Example 3, except that the heating furnace holding temperature was 1350° C.

When the reaction product remaining in the carbon reactor was examined after cooling, solid SiO and CaO were found to be present in roughly their original forms, with only a portion thereof melted to liquid.

Example 4

Using 250 g of 99.999% pure solid SiO in the form of fine particles with a mean particle size of about 0.05 μm, 90 g of 99% pure calcium oxide in powder form and 120 g of 99% pure calcium fluoride in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 74 g, and elemental analysis thereof revealed Si at 99.999% purity. The glassy reaction residue present in addition to the Si mass was also analyzed and found to consist primarily of $SiO_2$, CaO and $CaF_2$.

Example 5

Using 250 g of 99.999% pure solid SiO in the form of flakes with sizes of a few centimeters square and thicknesses of no greater than 1 mm, 90 g of 99% pure calcium oxide in powder form and 120 g of 99% pure calcium fluoride in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 75 g, and elemental analysis thereof revealed Si at 99.999% purity. The glassy reaction residue present in addition to the Si mass was also analyzed and found to consist primarily of $SiO_2$, CaO and $CaF_2$.

Example 6

Using 250 g of 99.999% pure solid SiO in the form of masses with sizes of a few centimeters square, 90 g of 99% pure calcium oxide in powder form and 120 g of 99% pure calcium fluoride in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 76 g, and elemental analysis thereof revealed Si at 99.999% purity. The glassy reaction residue present in addition to the Si mass was also analyzed and found to consist primarily of $SiO_2$, CaO and $CaF_2$.

Example 7

Using 250 g of 99.999% pure solid SiO in the form of fine particles with a mean particle size of about 0.05 μm, 60 g of 99% pure calcium oxide in powder form, 100 g of 99% pure calcium fluoride in powder form and 70 g of 99% pure barium carbonate as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 71 g, and elemental analysis thereof revealed Si at 99.999% purity. The glassy reaction residue present in addition to the Si mass was also analyzed and found to consist primarily of $SiO_2$, CaO, $CaF_2$ and BaO.

Example 8

Using 250 g of 99.999% pure solid SiO in the form of fine particles with a mean particle size of about 0.05 μm and 100 g of 99% pure magnesium oxide in powder form as the starting materials, the materials were subjected to heat treatment, etc. with the same apparatus and conditions as in Example 1, except that the heating furnace holding temperature was 1650° C.

When the reaction product remaining in the carbon reactor was examined after cooling, the overall condition was observed to have been solidified after melting to liquid, and several nearly spherical masses with diameters of a few centimeters and exhibiting metallic gloss were found among the solid. The masses were recovered in an amount of 69 g, and elemental analysis thereof revealed Si at 99.999% purity. The glassy reaction residue present in addition to the Si masses was also analyzed and found to consist primarily of $SiO_2$ and MgO.

Example 9

Using 250 g of 99.999% pure solid SiO in the form of fine particles with a mean particle size of about 0.05 μm and 80 g of 95% pure sodium oxide in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 74 g, and elemental analysis thereof revealed Si at 99.999% purity. The amount of sodium in the Si was analyzed and found to be 62 ppm. The glassy reaction residue present in addition to the Si mass was also analyzed and found to consist primarily of $SiO_2$ and $Na_2O$.

Example 10

A 50 g portion of the Si obtained in Example 9 was placed in a carbon vessel and subjected to vacuum heat treatment for about 1 hour under conditions of approximately 1600° C. and with evacuation using a rotary pump. The Si was analyzed upon cooling after completion of the treatment, and the sodium content was found to be below 1 ppb by weight.

Example 11

Using 250 g of 99.999% pure solid SiO in the form of fine particles with a mean particle size of about 0.05 μm and 120 g of 99% pure sodium carbonate in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 73 g, and elemental analysis thereof revealed Si at 99.999% purity. The glassy reaction residue present in addition to the Si mass was also analyzed and found to consist primarily of $SiO_2$ and $Na_2O$.

Example 12

Using 250 g of 99.999% pure solid SiO in the form of fine particles with a mean particle size of about 0.05 μm and 100 g of 99% pure sodium hydroxide in particle form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of about 100 g, with the surrounding glassy substance attached thereto. The glassy substance completely dissolved upon washing with hydrofluoric acid at a concentration of 50 wt %. The remaining metal glossy mass was recovered in an amount of 72 g, and elemental analysis thereof revealed Si at 99.999% purity.

Example 13

Using 250 g of 99.999% pure solid SiO in the form of fine particles with a mean particle size of about 0.05 μm and 100 g of 99% pure sodium hydroxide in particle form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of about 100 g, with the surrounding glassy substance attached thereto. The glassy substance completely dissolved upon placement in a beaker together with 100 mL of water and heating with a burner. The remaining metal glossy mass was recovered in an amount of 73 g, and elemental analysis thereof revealed Si at 99.999% purity. The glassy reaction residue present in addition to the Si mass was also analyzed and found to consist primarily of $SiO_2$ and $Na_2O$.

Example 14

Using 250 g of 99.999% pure solid SiO in the form of fine particles with a mean particle size of about 0.05 μm and 180 g of 98% pure sodium metasilicate ($Na_2O$—$SiO_2$) in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 73 g, and elemental analysis thereof revealed Si at 99.999% purity. The glassy reaction residue present in addition to the Si mass was also analyzed and found to consist primarily of $SiO_2$ and $Na_2O$.

Example 15

Using 250 g of 99.999% pure solid SiO in the form of fine particles with a mean particle size of about 0.05 μm and 140 g of 99% pure potassium hydroxide in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 73 g, and elemental analysis thereof revealed Si at 99.999% purity. The glassy reaction residue present in addition to the Si mass was also analyzed and found to consist primarily of $SiO_2$ and $K_2O$.

Example 16

The same starting materials used in Example 1 were subjected to heat treatment, etc. with the same apparatus and conditions as in Example 1, except that air was used as the gas introduced into the heating furnace and a lidded alumina crucible was used as the vessel holding the starting materials.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 72 g, and elemental analysis thereof revealed Si at 99.99% purity. The glassy reaction residue present in addition to the Si mass was also analyzed and found to consist primarily of $SiO_2$ and $Na_2O$ and about 3% $Al_2O_3$.

Example 17

The same starting materials used in Example 1 were subjected to heat treatment, etc. with the same apparatus and conditions as in Example 1, except that hydrogen gas was used as the gas introduced into the heating furnace.

When the reaction product remaining in the carbon reactor was examined after cooling, the overall condition was observed to have been solidified after melting to liquid, and a single nearly spherical mass with a diameter of about 4 cm and exhibiting metallic gloss was found among the solid. The mass was recovered in an amount of 77 g, and elemental analysis thereof revealed Si at 99.999% purity. The glassy reaction residue present in addition to the Si mass was also analyzed and found to consist primarily of $SiO_2$ and $Na_2O$.

Example 18

Using 50 g of 99.999% pure solid SiO in the form of fine particles with a mean particle size of about 0.05 µm, 100 g of 99.999% pure solid SiO in the form of flakes with sizes of a few centimeters square and thicknesses of no greater than 1 mm, 100 g of 99.999% pure solid SiO in the form of masses with sizes of a few centimeters square and 90 g of 99% pure calcium oxide in powder form as the starting materials, the materials were subjected to heat treatment, etc. with the same apparatus and conditions as in Example 1.

When the reaction product remaining in the carbon reactor was examined after cooling, the overall condition was observed to have been solidified after melting to liquid, and several nearly spherical masses with diameters of a few centimeters and exhibiting metallic gloss were found among the solid. The masses were recovered for a total of 73 g, and elemental analysis thereof revealed Si at 99.999% purity. The glassy reaction residue present in addition to the Si masses was also analyzed and found to consist primarily of $SiO_2$ and CaO.

Comparative Example 2

Using 50 g of 99.999% pure solid SiO in the form of fine particles with a mean particle size of about 0.05 µm, 100 g of 99.999% pure solid SiO in the form of flakes with sizes of a few centimeters square and thicknesses of no greater than 1 mm and 100 g of 99.999% pure solid SiO in the form of masses with sizes of a few centimeters square as the starting materials, the materials were subjected to heat treatment, etc. with the same apparatus and conditions as in Example 1. In other words, this comparative example differed from Example 18 in that absolutely no calcium oxide was added to the starting materials, thereby using solid SiO alone.

When the reaction product remaining in the carbon reactor was examined after cooling, there were no traces of molten liquid and metallic Si could not be confirmed with the naked eye. When the residue was treated with hydrofluoric acid, most of the product dissolved leaving approximately 5 g of an undissolved sandy substance. Elemental analysis of this undissolved substance identified it as Si at 99.9% purity.

This comparative example employed the process described in Japanese Patent Application No. 2000-526444, i.e. a process of producing Si characterized by heating solid SiO at between 1000° C. and 1750° C. for decomposition reaction to liquid or solid Si and solid $SiO_2$, and separating the produced Si from the $SiO_2$. However, because the solid SiO could not be uniformly and densely packed into the reactor, the separation of Si was incomplete and the Si yield was reduced.

The entire disclosures of all publications, patent applications/publications and patents referenced above are incorporated herein.

INDUSTRIAL APPLICABILITY

According to the process for production of Si of to the present invention, it is possible to accomplish efficient separation and extraction of Si by disproportionation reaction in its produced form, without steps such as shape ordering or classification of the solid SiO starting material, even if the solid SiO starting material is in a form which is difficult to pack uniformly at high density, i.e. in the form of fine particles, scales, amorphous masses or mixtures thereof, and therefore a major advantage in industrial utility is provided.

Thus, the process for production of Si according to the present invention is highly effective for industrial extraction of Si from solid SiO fine particles, flakes or amorphous masses produced in Si crystal pulling processes or in Si production steps in which silica stone is reduced with carbon, as described above.

The invention claimed is:

1. A process for producing Si, comprising the steps of:
   a) adding a solution to a solid SiO in a total molar amount of ¹/₂₀ to 1000 times with respect to moles of the solid SiO to form a mixture, the solution comprising an additive selected from an oxide, a hydroxide, a carbonate and a fluoride of an alkali metal element, an oxide, a hydroxide, a carbonate and a fluoride of an alkaline earth metal element, and any combination thereof;
   b) heating the mixture at approximately between the melting point of Si and 2000° C. to induce a chemical reaction between SiO and the additive, which produces Si and a $SiO_2$-containing glass reaction by-product; and
   c) separating and recovering Si from the reaction by-product.

2. The process according to claim 1, wherein the alkali metal element is at least one of sodium and potassium, and wherein the alkaline earth metal element is at least one of magnesium, calcium and barium.

3. The process according to claim 1, wherein, in step (b), the mixture is heated to a temperature between the melting point of Si and 1700° C.

4. The process according to claim 1, wherein the mixture is heated in an inert atmosphere.

5. The process according to claim 1, wherein the mixture is heated in an oxidizing atmosphere.

6. The process according to claim 1 wherein the mixture is heated in a reducing atmosphere.

7. The process according to claim 1, wherein at least 20 wt % of the solid SiO includes fine particles with a mean particle size of 1 µm or smaller, flakes with lengths of 1 cm or greater, amorphous masses with lengths of 1 cm or greater, or any combination thereof.

8. The process according to claim 1, further comprising, washing to remove deposits on Si with a hydrofluoric acid.

9. The process according to claim 1, further comprising washing Si with hot water at 30-300° C. to remove deposits on Si.

10. The process according to claim 1, further comprising vacuum-treating Si at a further temperature between the melting point and the boiling point of Si to increase purity.

11. A process for producing Si, comprising the steps of:
   a) adding a substance to a solid SiO in a total molar amount of ¹/₂₀ to 1000 times with respect to moles of the solid SiO to form a mixture, the substance comprising an additive selected from an oxide, a hydroxide, a carbonate and a fluoride of an alkali metal element, an oxide, a hydroxide, a carbonate and a fluoride of an alkaline earth metal element, and any combination thereof;

b) heating the mixture at approximately between the melting point of Si and 2000° C. to induce a chemical reaction between SiO and the additive, which produces Si and a $SiO_2$-containing glass reaction by-product; and c) separating and recovering Si from the reaction by-product.

12. The process according to claim 11, wherein the alkali metal element is at least one of sodium and potassium, and wherein the alkaline earth metal element is at least one of magnesium, calcium and barium.

13. The process according to claim 11, wherein, in step (b), the mixture is heated to a temperature between the melting point of Si and 1700° C.

14. The process according to claim 11, wherein the mixture is heated in an inert atmosphere.

15. The process according to claim 11, wherein the mixture is heated in an oxidizing atmosphere.

16. The process according to claim 11, wherein the mixture is heated in a reducing atmosphere.

17. The process according to claim 11, wherein at least 20 wt % of the solid SiO includes fine particles with a mean particle size of 1 μm or smaller, flakes with lengths of 1 cm or greater, amorphous masses with lengths of 1 cm or greater, or any combination thereof.

18. The process according to claim 11, further comprising washing to remove deposits on Si with a hydrofluoric acid.

19. The process according to claim 11, further comprising washing Si with hot water at 30-300° C. to remove deposits on Si.

20. The process according to claim 11, further comprising vacuum-treating Si at a further temperature between the melting point and the boiling point of Si to increase purity.

* * * * *